May 14, 1946.  J. R. ROLAND  2,400,139
LAMINATED GLASS
Filed Aug. 13, 1941
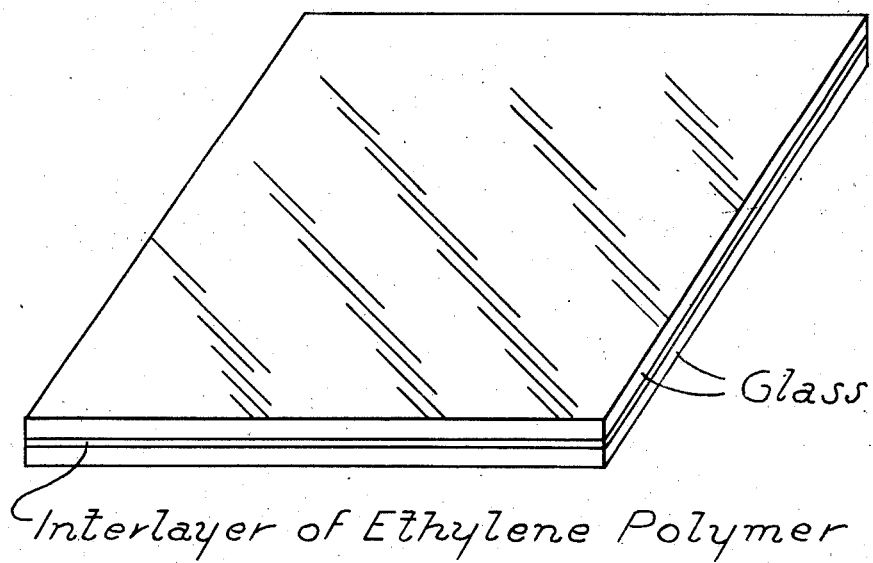
INVENTOR.
John R. Roland
BY *A. F. Miller.*
ATTORNEY Patented May 14, 1946

2,400,139

UNITED STATES PATENT OFFICE 2,400,139

LAMINATED GLASS

John R. Roland, Wilmington, Del., assignor to E. I. du Pont de Nemours & Company, Wilmington, Del., a corporation of Delaware Application August 13, 1941, Serial No. 406,701

1 Claim. (Cl. 154—2.77)

This invention relates to laminated articles and particularly to laminated glass.

In laminated glass the interlayer should have a high degree of toughness and resistance upon aging to embrittlement, loss of transparency, and loss of adhesion. It has heretofore been necessary to plasticize the resinous materials used as interlayers in order to obtain sufficient toughness. The plasticized compositions forming the interlayer, however, tend to become brittle through loss of plasticizer. Low temperatures also cause further difficulties. In the case of certain compounds, plasticized compositions of improved toughness and durability at low temperatures can be obtained, but the plasticizers which give satisfactory low temperature toughness with these polymers are uncommon. This fact has made necessary the use of special and expensive plasticizers which add considerably to the cost of the interlayer.

This invention has as an object improved laminated products. A further object is a laminated glass in which the laminae are united through a film or layer of great strength and durability. Other objects will appear hereinafter.

The above objects are accomplished by uniting the glass laminae with a film of a polymer of ethylene with at least one other polymerizable organic compound. These polymers are obtained by polymerizing a mixture of ethylene with at least one other polymerizable organic compound having the formula

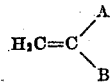

wherein A is hydrogen, halogen, or a monovalent hydrocarbon radical and B is halogen or an organic radical containing a carbon atom joined to another atom by a plural bond, the carbon atom being removed from the $H_2C=C=$ group by not more than one chain atom.

Polymers of ethylene with polymerizable organic compounds can be obtained by the following general procedure:

A pressure vessel is charged with a peroxide or other suitable catalyst, water, polymerizable organic compound, and, if desired, an inert normally liquid organic solvent. The vessel is closed, pressured with ethylene so that at reaction temperature the pressure will be in excess of 50 atmospheres, and preferably from 300 to 1500 or more atmospheres, and the whole system agitated and heated to a temperature between 40° and 350° C. and generally from 60° to 250° C. Upon reaching the reaction temperature, or after a short period of incubation, the reaction starts. Throughout the period of reaction the pressure is maintained in the desired range by periodic introductions of additional ethylene. When the reaction is complete the vessel is cooled, bled of excess ethylene, opened, the contents discharged, and the product is isolated from the reaction mixture.

The products described herein comprise two or more laminae, at least one of which is a glass sheet, united by means of a sheet of polymer of the kind described hereinabove. More particularly, the products are laminated glasses composed of two sheets of glass having therebetween a film or layer of the polymer described above which may be used as the sole bonding agent or as the interlayer.

The laminated glass shown in the single figure in the drawing consists of two laminae of glass having therebetween a film of the polymer described above.

In one form of the invention, a sheet of polymer of the desired thickness, generally of from about 5 to about 50 mils in thickness is prepared from the polymer either by melt extrusion, by casting from solution of the polymer, or by slicing from a preformed cake of the polymer, the sheet thus obtained is placed between two well cleaned glass plates and the assembly pressed together under the influence of heat. A temperature close to the softening point of the polymer is generally used. In another form of practicing the invention the assembly is subjected to preliminary pressing, after which the assembly is placed in an autoclave and pressed at about 150 lbs./sq. in. at a temperature close to the softening point of the polymer.

In some cases it may be desired to obtain better adhesion to glass than exhibited by a specific polymer. Improved adhesion can be obtained by first applying a very thin film of an adhesive to the glass surfaces which are to be in direct contact with the polymer film or layer. These films of adhesive serve only as bonding agents and are generally of the order of 0.01 mil or less in thickness. Suitable adhesives are diphenylolpropane-formaldehyde resins, solutions of pyroxylin and diamyl phenol, or complexes of silicic acid with trialkylphosphates. These complexes, because of the stronger lamination obtained, are particularly valuable as an adhesive in the present laminated glass products. Of the trialkylphosphate-silicic acid complexes the preferred is that from tributylphosphate and silicic acid whose preparation is described hereinafter.

The invention is further illustrated by the following examples, wherein parts are by weight unless otherwise stated.

*Example I*

A polymer of vinyl acetate and ethylene having a vinyl acetate to ethylene mole ratio of 1:8.2 is pressed in a 5″ x 8″ mold and sheeted to films of 25 mils in thickness. Laminations are prepared by first coating 5″ x 5″ glass plates with a solution composed of 40% nitrocellulose and 60% diamyl phenol and drying the plates, inserting in between two sheets of the treated glass a film of the indicated thickness of the described ethylene/vinyl acetate polymer and subjecting the assembly to heat and pressure. The laminated glass is then placed on a frame which is so designed that the lamination lies perfectly flat, being supported only by its edges. A one-half pound steel ball is dropped directly on the center of the lamination and the maximum height from which the ball can be dropped without going through the lamination is determined. A number of laminations are thus required to determine the maximum height from which the ball can be dropped without going through the lamination at any one temperature. The test is carried out at —18°, 21° and 50° C. The laminations prepared as described above hold the one-half pound ball when dropped 30′ at —18° C., 30′ at 21° C., and 14′ at 50° C. These results are superior to commercial safety glass laminations at 0° C. and at room temperature when tested under similar conditions.

The polymer mentioned in the above example is conveniently prepared by the following procedure:

A 400 cc. stainless steel lined reactor is charged with 50 parts of freshly distilled vinyl acetate, 50 parts of deaerated water and 0.2 part of benzoyl peroxide as catalyst. The vessel is closed, evacuated to remove residual air, placed in a shaker machine, fitted with thermocouples and connected to a source of high pressure ethylene. The vessel is pressured to 600 atmospheres with ethylene and heating and agitation are started. Throughout a reaction time of 9.75 hours, during which the temperature is maintained at 73° to 77° C. and the pressure at 800 to 975 atmospheres, the total pressure drop observed is 655 atmospheres. The vessel is then opened, the excess ethylene removed, and the contents discharged. The reaction mixture is then steam distilled to remove unreacted vinyl acetate and acetaldehyde. The residual polymer is separated from water and dried. There is thus obtained 61 parts of polymer having an intrinsic viscosity of 1.22 (0.125% xylene at 85° C.) and analyzing 77.6% carbon and 12.6% hydrogen, from which it is calculated that the product has a vinyl acetate to ethylene mole ratio of 1:8.2.

A composite sample is prepared by blending several batches of the above polymer. The composite sample has an intrinsic viscosity of 1.14 (0.125% solution in xylene at 85° C.) and analyzes 77.4% carbon and 12% hydrogen, from which it can be calculated that the mole ratio of vinyl acetate to ethylene is 1:8. This polymer is used in making laminated glass as previously described with analogous results.

*Example II*

A vinyl acetate/ethylene polymer is prepared as described in Example I having a vinyl acetate to ethylene mole ratio of 1:15 and an intrinsic viscosity of 1.08 (0.125% solution in xylene at 85° C.). Films of 15 mils in thickness are prepared by flowing from a hot solution of the polymer in perchloroethylene. The laminated glass is prepared using these films as interlayers as follows:

Sheets of glass 12″ x 12″ are thoroughly cleaned and treated by coating them with very thin film of the tributylphosphate-silicic acid complex described below. An assembly is prepared by inserting the film of polymer described above in between two sheets of the treated glass, the assembly pressed at 160° C. and then autoclaved at 180° C. under 200 lbs./sq. in. pressure.

The laminated glass is tested as described in Example I at 20° and 50° C. The laminated glass holds a one-half pound ball when dropped 37′ at 20° C. and 21′ at 50° C.

The tributylphosphate-silicic acid complex is prepared as follows:

A solution of sodium silicate (400 cc.) which is 2 molar in $SiO_2$ is added slowly over a period of 5 to 10 minutes to a vigorously stirred mixture of 132 cc. of 20% sulfuric acid, 280 cc. of water and 100 cc. of tributylphosphate. To this mixture is added 225 parts of salt and stirring is continued for about one hour. After separating, the lower aqueous layer is withdrawn and the upper layer centrifuged to remove occluded water, filtered, and dried.

*Example III*

A methyl methacrylate/ethylene polymer prepared as in Example I containing methyl methacrylate and ethylene in a mole ratio of 1:8.6 and an intrinsic viscosity of 0.31 (0.125% in xylene at 85° C.) is pressed at 81° C. into tough, strong, films of 25 mils in thickness, which films have excellent flexibility and pliability at temperatures as low as —40° and —50° C. The films thus made are used in laminating two glass plates as described in Example I. These laminations show good toughness at —18° C. and are comparable to commercial safety glass at 21° and 50° C., respectively.

The examples illustrate the use of certain polymers of ethylene with vinyl acetate and methyl methacrylate. The properties of these polymers can be varied by varying the ratio of ethylene to vinyl acetate or methyl methacrylate. Polymers of a wide range of properties can also be obtained by using other polymerizable organic compounds in place of, or in addition to, vinyl acetate or methyl methacrylate. Examples of suitable polymerizable organic compounds include monoolefins, e. g., propylene, butylene; dichloroethylenes such as 1,1-dichloroethylene, etc., 2-chloropropene-1 and tetrafluoroethylene, etc.; vinyl ethers, ketones, esters, and other vinyl compounds such as methyl and propyl vinyl ethers, methyl and ethyl vinyl ketones, vinyl chloroacetate, vinyl chloride, vinyl propionate, vinyl trimethyl acetate, N-vinyl phthalimide, vinyl thiol acetate, methyl vinyl thioether, methyl vinyl sulfone, vinyl carbazole, vinyl sulfonic esters, etc; styrene, stilbene, etc.; acrylic and methacrylic acids, their amides, nitriles, esters, e. g., methyl, ethyl, and propyl acrylates and methacrylates, methylene diacrylate and dimethacrylate, etc.; alpha-halocrylic acids and esters, e. g., methyl alpha-chloroacrylate, etc.; esters of crotonic and itaconic acids, e. g., methyl crotonate and diethyl itaconate; butadiene, isoprene, chloro-2-butadiene-1,3; terpenes, e. g., limonene and camphene, etc.

The term "polymer" is used herein to refer to the products obtainable by polymerizing ethylene with one or more of the above materials.

The films used in the preparation of the laminated products of this invention can be obtained by any of the processes known in the art, such as, for example, by casting from solutions or from melts, by extrusion from melts, by extrusion of solutions into suitable coagulating baths, or by slicing from preformed blocks of polymer. Although the use of clear, transparent interlayers is essential in the preparation of safety glass, for certain applications it is advantageous that the interlayer be opaque. For the preparation of such articles it is often desirable to incorporate into the polymer incompatible materials such as pigments, extenders, fillers, resins, polydienes, such as polyisobutylene, or organic cellulose derivatives.

The laminated glass of this invention generally consists of two sheets of glass adhesively bound together through a film of a polymer of ethylene with at least one other polymerizable organic compound. In the preparation of such articles the polymer film may constitute the sole bonding agent or it may be the interlayer, in which event it is used in conjunction with an adhesive. If desired transparent articles can be made by laminating sheets of transparent organic polymers and cellulose derivatives, e. g. polymethyl methacrylate, styrene, cellulose acetate, etc., using the polymers of this invention as the interlayers.

For use in safety glass the preferred polymers are those obtained by polymerizing ethylene with organic vinyl esters and especially with vinyl acetate. The ethylene/vinyl acetate polymers can contain from 7 to 50 moles of ethylene per mole of vinyl acetate. The polymers containing from 12 to 50 moles of ethylene per mole of vinyl acetate and illustrated by Example II yield tough, clear, flexible films which are characterized by having excellent cold drawing properties and by good retention of flexibility and toughness at low temperatures. Laminated glasses in which films of these polymers are used as the interlayer show good resistance to shattering at temperatures above normal. In general, as the ratio of vinyl acetate to ethylene in the polymer increases, up to a limiting value of about 1 mole of vinyl acetate per 5 moles of ethylene, adhesion to glass increases. The polymers possessing the best properties for safety glass use are those which contain from 7 to 20 moles of ethylene per mole of vinyl acetate and products in this range of composition are therefore preferred in the practice of this invention.

The laminated glasses of this invention are characterized by great strength and non-shattering properties. Since these glasses generally contain no extraneously added plasticizer the highly desirable properties initially possessed by the laminated glass are not impaired by aging. The present laminated glass is especially valuable as safety glass in motor vehicles, aeroplanes, etc. The invention is also useful in making burglar-proof glass and in the preparation of double window glass.

As many apparently widely different embodiments of this invention may be made without departing from the spirit and scope thereof, it is to be understood that I do not limit myself to the specific embodiments thereof except as defined in the appended claim.

I claim:

A laminated product comprising at least two sheets of glass having therebetween a flexible tough transparent interlayer of a polymer which is obtained by polymerizing ethylene with vinyl acetate and which by analysis corresponds to a polymer containing from 12 to 50 mols of ethylene per mol of vinyl acetate.

JOHN R. ROLAND.